(No Model.)

J. G. CASEY.
DEVICE FOR STOPPING RUNAWAY HORSES.

No. 546,694. Patented Sept. 24, 1895.

Witnesses
L. Wieser
G. M. Copenhaver

Inventor
James G. Casey
by H. H. Doubleday
Attorney

UNITED STATES PATENT OFFICE.

JAMES G. CASEY, OF LEHIGH, INDIAN TERRITORY, ASSIGNOR OF ONE-FOURTH TO FELIX PHILLIPS, OF SAME PLACE.

DEVICE FOR STOPPING RUNAWAY HORSES.

SPECIFICATION forming part of Letters Patent No. 546,694, dated September 24, 1895.

Application filed February 28, 1895. Serial No. 540,099. (No model.)

*To all whom it may concern:*

Be it known that I, JAMES G. CASEY, a citizen of the United States, residing at Lehigh, in the county of Choctaw, Indian Territory, have invented certain new and useful Improvements in Devices for Stopping Horses, of which the following is a specification, reference being had therein to the accompanying drawings.

Figure 1:
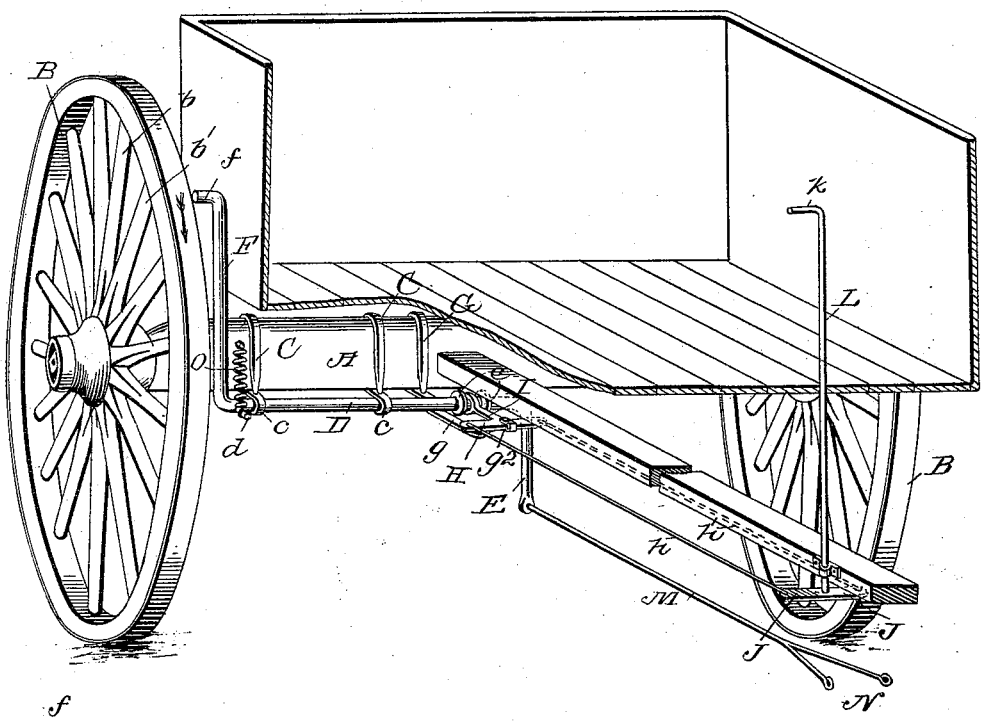
Figure 2:
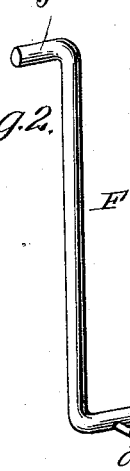
Figure 3:
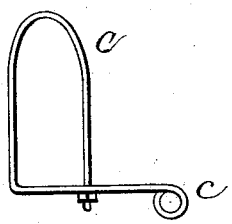
Figure 4:
Figure 5:
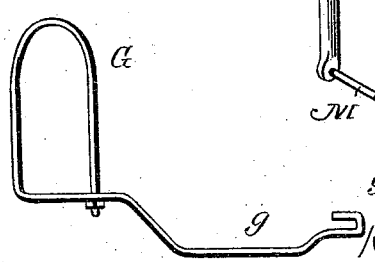

Figure 1 is a perspective view of so much of a wagon having my invention applied thereto as is necessary to illustrate the construction and operation of the improvement. Figs. 2, 3, 4, and 5 are detached views of various parts of the device.

One part of my invention relates to a combination of devices through which the reins can be so connected with one of the wheels of the vehicle that the forward rotation of such wheel will pull backward upon said reins and check the forward movement of the horse or horses, as the case may be.

Another part of the invention relates to the combination, with part of said devices, of a stop by means of which when such devices are in combination with one of the wheels said wheel is locked against backward rotation, so that when my invention is in proper working position the horse will be prevented from moving either forward or backward.

Like reference-letters refer to the same parts wherever employed.

One construction which I have found desirable in carrying my improvement into operation is as follows:

A represents the rear axle of a vehicle of any sort which is adapted to have my invention applied thereto, but which need not be specifically described.

B is one of the wheels, which, when the vehicle is moving forward, rotates in the direction indicated by the arrow, and for convenience of description I have marked two of the adjacent spokes $b$ and $b'$.

D E F is a rock-shaft, the cranks E F of which preferably project in about diametrically-opposite directions, one up, the other down. This rock-shaft is firmly supported, preferably from the axle, by means of two or more shaft-hangers C $c$, of which the loop-shaped portion is adapted to clasp the axle tightly, the bearing part $c$ fitting the shaft properly, and while I have shown the bearing $c$ as a closed eye it may have a movable cap-like part to facilitate putting the shaft in place and removing it. I prefer to call the crank-arm F the "wheel-crank," because it engages with one of the wheels, and to call the other crank-arm the "rein-crank," and by reason of one of the cranks being disposed in proper relation to the axle it is free to move away from the axle when the reins are being pulled upon; but the axle serves as an abutment to prevent any movement in the reverse direction beyond about the normal, whereby the wheel-crank serves as a stop to resist a backward movement of the vehicle.

G indicates, generally, a lever-carrier, which is likewise preferably provided with a loop-like part adapted to clasp the axle, it having an arm $g$, which projects forward and carries at its end a lever-bearing $g'$, which in this instance is shown in the form of a stirrup or U shape, with a vertical pivot $g^2$ supported therein.

H I is a T-lever mounted on pivot $g^2$, the rear end of the arm I being forked, as is indicated at $i$, to straddle the rock-shaft and engage alternately with the collars or flanges $e$ $e$, whereby said lever may be operated as a shipping-lever to move the rock-shaft endwise, as will soon be explained.

It is well known that with many kinds of wagon it is customary to increase the distance between the fore wheels and the hind wheels by sliding the reach through a staple or loop-shaped fastening attached to the under side of the hind axle, an operation which would be impracticable were the shipping-lever H I mounted on the reach, because the working relation of the fork $i$ and the rock-shaft would be disturbed whenever such movement of the reach relative to the hind axle were made, whereas by mounting the said shipping-lever on a carrier which is attached directly to the axle all difficulty of that sort is obviated.

J J are shifting-arms mounted on the lower end of the shifting-shaft L, which has at its upper end some sort of a handle K to facilitate the drivers turning it and the arms J J, the shaft being mounted in bearings, which in turn are mounted upon some part of the vehicle—such as, for instance, the box, the body, or the reach, as may be found most desirable in each particular case—in order that the upper end of said shifting-shaft may be within convenient reach of the driver. The shifting-arms are connected with the shipping-lever by means of links $h\ h'$, which may be conveniently made of suitable-sized wire. The arm $g$ may pass either above or below the rock-shaft, and should be of such shape that its front end is in about the same horizontal plane with the said shaft, so as to avoid cramping of parts when the shipping-lever is being operated.

M is a link attached at its rear end to the lower end of crank-arm E, with its forked end extending forward to some convenient place for the attachment of the reins, the forks N being perferably provided with means for readily connecting the reins thereto.

O is a returning spring, connected at one end to the axle or some other suitable support and at its lower end to an arm $d$ of the rock-shaft, the relation of parts being such that the spring normally holds the crank-arm F in a practically-upright position and the crank-arm E projecting downward and projecting a little forward of a vertical line. Normally the parts are in about the position indicated in the drawings—that is to say, with the outwardly-projecting elbow $f$ of the crank-arm F so far inside of the path traveled by the spokes of the adjacent wheel that there will be no danger of accidental engagement of the elbow with a spoke. The driver can attach the reins to the link or rope M N, and by turning the shifting-shaft K throw the crank-arm F outward so far that the elbow $f$ is thrust between two adjacent spokes and will be engaged by one of them if the wheel rotates forward and by another spoke if it rotates backward. Thus if the horses attempt to move ahead the rotation of the said wheel will turn the rock-shaft in the direction indicated by the arrow $l$, which will swing the crank-arm E backward, and thus pull upon the reins with such force as to check effectually their movement in that direction. If, however, they attempt to go backward, the engagement of another spoke with the elbow will carry the same crank-arm against the axle, which will stop the backward rotation of the wheel and thus resist further movement of the vehicle in that direction, as will be readily understood without further explanation. This double function of the device is made possible by the oppositely-projecting cranks of the rock-shaft, whereby when the device is in operation the rein-crank E is moved backward as the wagon moves forward, thus preventing the horses from advancing, while the engagement of the wheel-crank F with the axle restrains them from backing, a mode of operation which would obviously be impossible were the shaft connected with the wagon-wheel by such a contrivance as a gear with a backing-ratchet, for instance, which would permit the wagon-wheel to turn backward without a corresponding movement of the shaft.

It is obvious that in my invention the wheel crank F serves not only to impart a forward rotation to the rock-shaft, but also as a stop to prevent backward rotation to the wheel with which it engages. The spring O will return the said arm to its practically-upright position, in case it is left elsewhere after it has been moved inward, so that its elbow is inside the path of the spokes when rotating.

Having thus set forth the best mode now known to me for carrying my invention into practice, I wish to state that I do not desire to be limited to the precise details of construction herein shown and described, because many modifications thereof will readily suggest themselves without departing from the spirit of my improvement.

What I claim is—

1. In a device for checking run away horses, the combination with the axle and the wheel of the rock-shaft having at one end a downward projecting crank and at the opposite end an upward projecting wheel crank, and means for moving the wheel crank into engagement with the wheel, substantially as set forth.

2. In a device for checking run away horses, the combination with the axle and the wheel of a rock-shaft having two oppositely projecting cranks of which one is disposed in close proximity to the axle, of means for moving the wheel crank into engagement with the wheel, whereby as the wheel rotates forward a crank is moved from the axle and when the wheel rotates backward the said crank engages with the axle and serves as a stop to resist backward movement of the vehicle, substantially as set forth.

3. In a device for checking runaway horses, the combination with a rock-shaft having two oppositely projecting cranks, and the wheel which engages one of the cranks of a spring for rotating the shaft backward, and a stop for resisting the backward rotation of the shaft beyond its normal position, substantially as set forth.

4. In a device for checking run away horses, the combination with the rear axle, of the rock-shaft having at one end the wheel crank arranged vertically in front of the axle, a downward rein crank, and means for moving one crank into engagement with the wheel, whereby as when the wagon is moved forward the said vertical crank is moved from the axle and when the rein crank is moved forward the said vertical crank engages with the axle and serves as a stop to resist backward movement of the vehicle, substantially as set forth.

In testimony whereof I affix my signature in presence of two witnesses.

JAMES G. CASEY.

Witnesses:
BOONE WILLIAMS,
ARTHUR JONES.